UNITED STATES PATENT OFFICE.

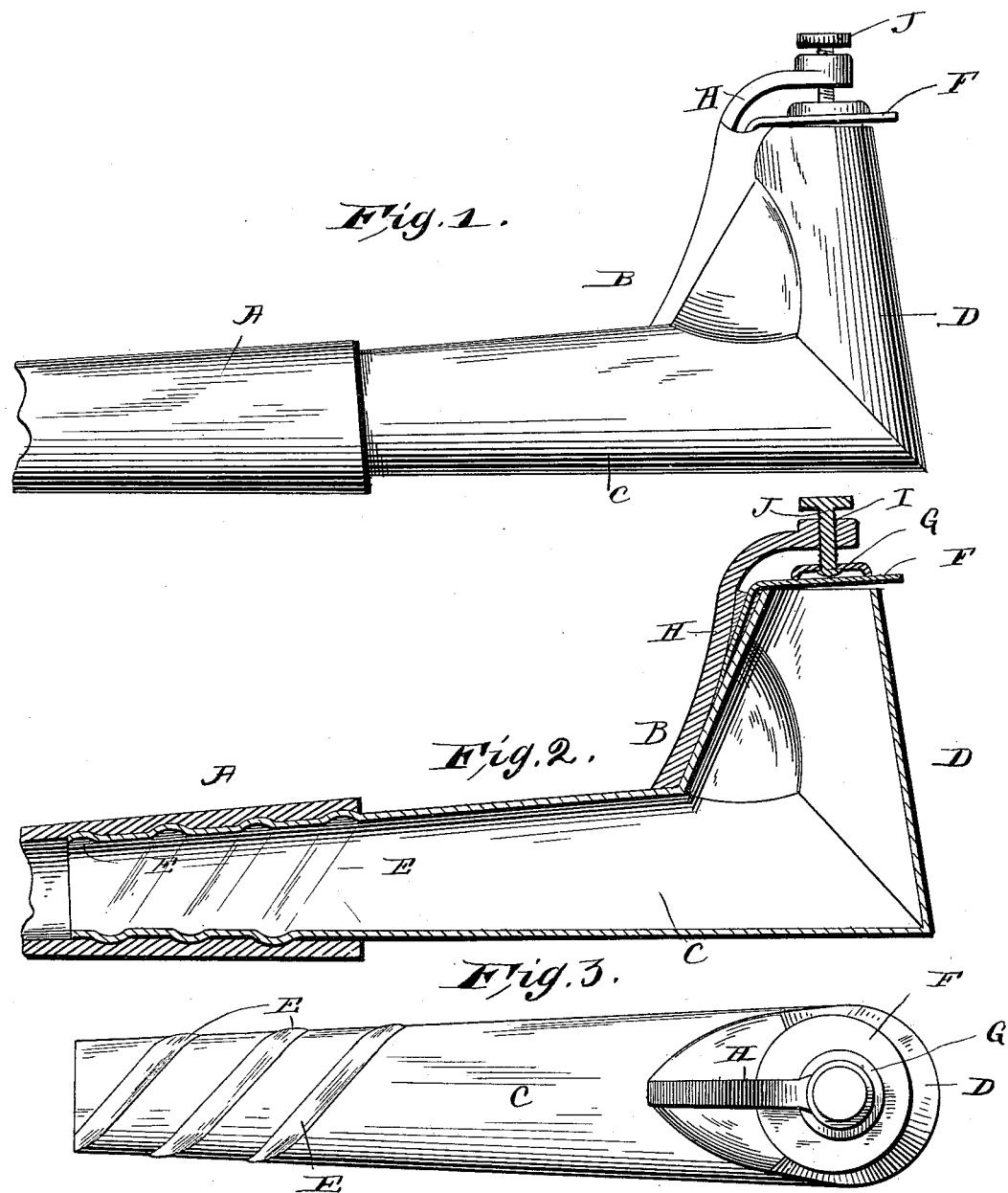

WILLIAM KISTER, OF WEIMAR, TEXAS.

COTTON-SPRINKLER.

SPECIFICATION forming part of Letters Patent No. 403,475, dated May 14, 1889.

Application filed August 24, 1888. Serial No. 283,670. (No model.)

*To all whom it may concern:*

Be it known that I, WILLIAM KISTER, a citizen of the United States, residing at Weimar, in the county of Colorado and State of Texas, have invented new and useful Improvements in Cotton-Sprinklers, of which the following is a specification.

My invention relates to improvements in cotton-sprinklers; and it consists in certain novel features hereinafter described and claimed.

In the accompanying drawings, Figure 1 is a side view of my improved device. Fig. 2 is a central longitudinal section of the same. Fig. 3 is a plan view of the same.

Referring to the drawings by letter, A designates a section of hose, and B designates my improved nozzle applied thereto. My improved nozzle consists of a long outwardly-flaring arm or branch, C, and a short tapered arm, D, extending from the outer larger end of the arm C, thus forming an L-shaped pipe. Near the inner smaller end of the branch C, I form a series of parallel spiral ridges, E, which serve to secure the nozzle in the end of the hose, as clearly shown. To the outer end of the smaller branch, D, I secure a spring cap or valve, F, having a boss, G, on its upper side. On the inner side of the shorter branch I secure an L-shaped bracket-arm, H, which projects outward and over the spring cap or valve F. This bracket H is provided at its extremity with an interiorly-threaded opening, I, and in the said opening I mount a thumb-screw, J, the inner end of which is swiveled in the boss G on the upper side of the spring valve or cap L.

In practice the inner end of the larger branch, C, of the nozzle is made to engage the end of the hose, and is secured therein by being turned, so as to cause the ridges E to enter the body of the hose, and cause the elasticity of the hose to bind the same around the nozzle. The nozzle will thus be secured firmly in place without the use of any rivets or washers, or any other securing devices. The hose is then placed in communication with a suitable source of supply—such as a small hand-pump or tank—and the valve is adjusted by means of the said screw to allow the water or poisonous mixture to escape from the shorter branch of the nozzle. When desired to stop the flow of the water or other fluid, the valve is forced against the end of the shorter branch by turning up the said screw, as will be readily understood. When the set-screw is turned outward, the valve will automatically open. By opening the valve to its fullest extent the fluid will escape in a narrow stream, while by adjusting the valve toward the end of the shorter branch of the nozzle, which forms the valve-seat, the fluid can be sprayed.

It will thus be seen that I have provided a very cheap and simple device by means of which poison can be quickly applied to a large number of cotton-plants, thereby destroying the worms and insects thereon.

While my nozzle is especially adapted for use in applying poison to cotton and other plants, it can be used also for watering the plants, as will be readily understood.

The valve or cap being a spring-valve, as before stated, will automatically open upon turning the set-screw outward, and this action will be accelerated by reason of the swiveled connection of the set-screw thereto, and should the valve by reason of long-continued use refuse to act automatically this swiveled connection will enable the operator to readily adjust the valve as desired.

Having thus described my invention, what I claim, and desire to secure by Letters Patent, is—

The combination of the L-shaped nozzle, having the longer arm, C, and the shorter arm, D, the spring-valve secured to the side of the arm D and projecting over the end thereof, and provided with a boss, G, on its upper side, the L-shaped bracket H, secured to the side of the arm D and having one end projecting over the spring-valve and provided with a screw-threaded opening, I, and the thumb-screw J, inserted through and playing in said opening and having its end swiveled in the boss G of the spring-valve, as specified.

In testimony that I claim the foregoing as my own I have hereto affixed my signature in presence of two witnesses.

WILLIAM KISTER.

Witnesses:
JAS. T. CONE,
R. E. L. RAMSEY.